Jan. 23, 1962

J. W. FRIED 3,017,791

TOOL FOR DEBURRING, CHAMFERING, BACK
SPOT-FACING, GROOVING, ETC.

Filed Feb. 15, 1960

INVENTOR.
JOSEPH W. FRIED

BY Hazard & Miller

ATTORNEYS.

INVENTOR.
JOSEPH W. FRIED
BY
Hazard & Miller
ATTORNEYS.

INVENTOR.
JOSEPH W. FRIED

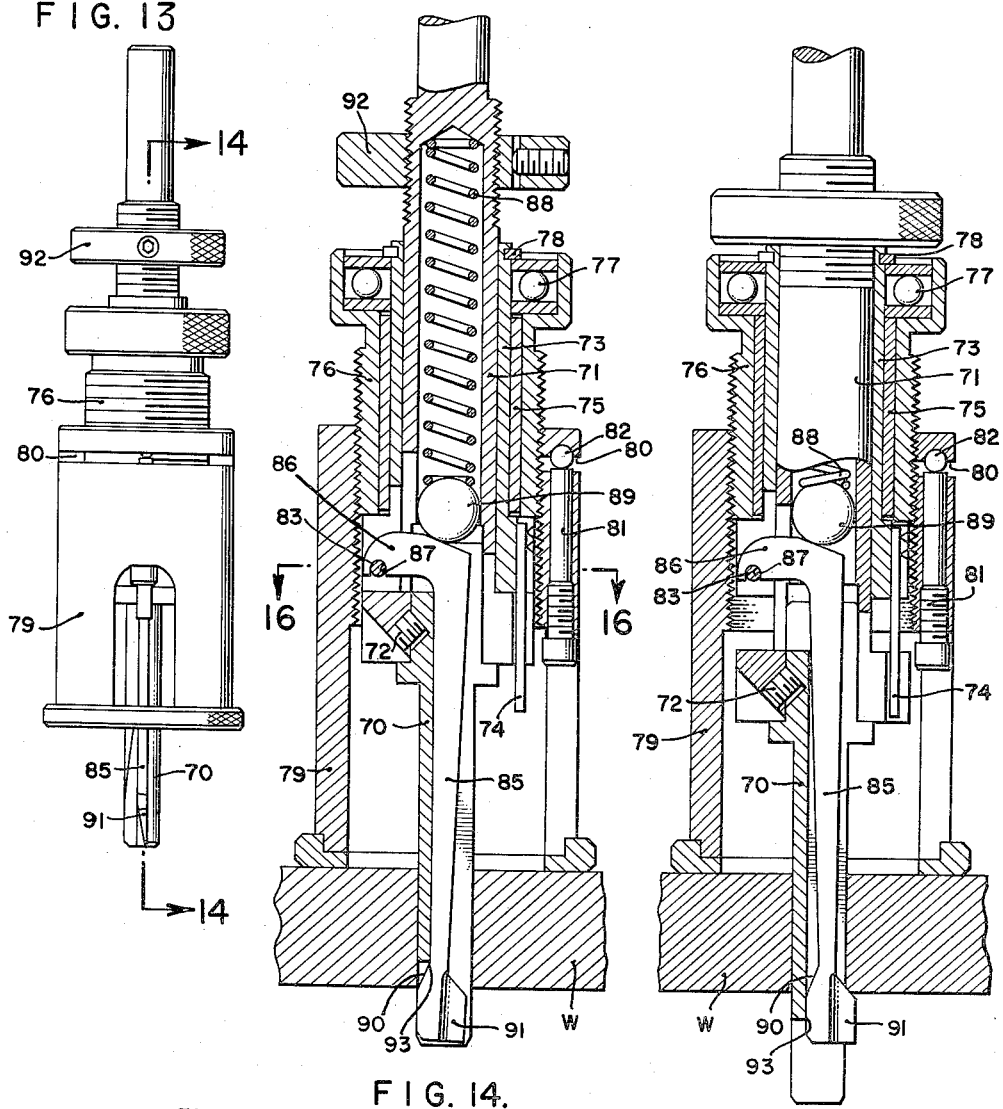
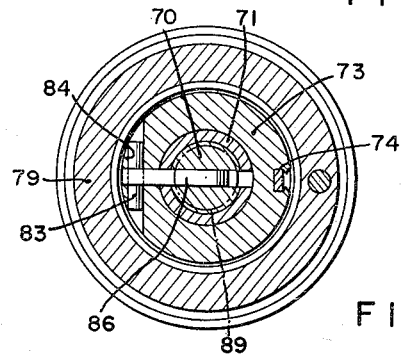

3,017,791
TOOL FOR DEBURRING, CHAMFERING, BACK SPOT-FACING, GROOVING, ETC.
Joseph W. Fried, 6860 Farmdale Ave., North Hollywood, Calif.
Filed Feb. 15, 1960, Ser. No. 8,695
17 Claims. (Cl. 77—73.5)

This invention relates to improvement in tools used for deburring, chamfering, back spot-facing, grooving and similar operations. It may be considered as an improvement over United States Letters Patent No. 2,314,084, issued March 16, 1943, to Armin Fried; No. 2,663,203, issued December 22, 1953, to Armin Fried and Joseph W. Fried; No. 2,706,421 issued Apr. 19, 1955, to Armin Fried and Joseph W. Fried; and No. 2,745,299, issued May 15, 1956, to Joseph W. Fried and Armin Fried.

In the above-mentioned patents, tools of a generally similar character are disclosed consisting essentially of a pilot adapted to be inserted into a hole in a piece of work and rotated therein. Within the pilot there is disposed a cutter that is swingably mounted and which normally occupies a retracted position wholly within the contour of the pilot or substantially so. After the pilot has been inserted into the hole the cutter can then be shifted or swung to cause its cutting edge to protrude laterally from within the contour of the pilot and perform various operations, such as deburring, chamfering, back spot-facing, grooving and the like. In all of the above-described constructions the cutter is pivotally mounted at a point remote from its cutting edge and in all of the above-mentioned patents, with the exception of Patent No. 2,706,421, the cutter is caused to swing about its pivot from retracted into advanced or cutting position by the application of a force thereto more remote from the cutting edge than the pivot.

In Patent No. 2,706,421, the cutter is advanced from its retracted position to cutting position by the application of force to the cutter blade intermediate the pivot and the cutting edge. All of these constructions are subject to the criticism that the cutter blade which necessarily is quite thin is consequently caused to function somewhat as a lever fulcrumed at the pivot and swung about the pivot by the application of a force either more remote or less remote from the cutting edge than the pivot. That portion of the cutter blade between its cutting edge and the pivot, or between the cutting edge and the advancing force, as disclosed in Patent No. 2,706,421, consequently acts as a cantilever beam which, due to the fact that the cutter blade is thin and of relatively narrow width, tends to flex; the flexure of the unsupported lower end of the cutter blade is conducive to chattering of the cutter blade and makes it difficult to back spot-face, groove, or perform similar operations with a high degree of precision.

An object of the present invention is to provide a tool of this character wherein the cutting edge portion of the blade is advanced toward the workpiece in performing its cutting operation by mutually engaging portions between the cutter blade and the pilot located in the immediate vicinity of the cutting edge so that the cutting edge is effectively backed up or supported by the pilot very close to the point where cutting takes place and where reactionary forces imposed on the cutting edge by the work being cut can be carried effectively by the pilot which can be materially heavier than the cutter blade itself. In this manner, not only is the objectionable chattering avoided, but the tool may be constructed to perform its operations with a high degree of precision.

Another object of the invention is to provide a tool of this general character which is so designed as to facilitate the removal and substitution or replacement of the pilot and/or cutter. The prior devices disclosed in the above-mentioned patents employed pivot pins on which the cutters were swingably mounted, the pivot pins extending through closed apertures in the cutters. Consequently, to remove and replace a cutter involved a removal of the pivot pin and while in some constructions this might be easily accomplished, the removal and replacement of the pilot usually involved a disassembly of a substantial portion of the tool. In accordance with the present invention the mere removal of a single set screw enables a removal and replacement of the pilot and also of the cutter without requiring a removal of the pivot pin on which the cutter is swingably mounted.

Another object of the invention is to provide an adjustable means for pre-setting the operating position of the cutter as measured from the face of the workpiece that is being worked upon, and to provide an adjustable means for limiting longitudinal travel of the pilot and its spindle and consequently limiting the projection of the cutter from the pilot.

With the foregoing and other objects in view, which will be made manifest in the following detailed description and specifically pointed out in the appended claims, reference is had to the accompanying drawings for an illustrative embodiment of the invention, wherein:

FIG. 13 is a view in side elevation of another form of tool embodying the present invention;

FIG. 14 is a view in vertical section on a larger scale taken substantially upon the line 14—14 upon FIG. 13, the cutter being shown in its retracted position;

FIG. 15 is a view similar to FIG. 14 but illustrating the cutter in its advanced position; and FIG. 16 is a horizontal section taken substantially upon the line 16—16 upon FIG. 14.

Figure 1:
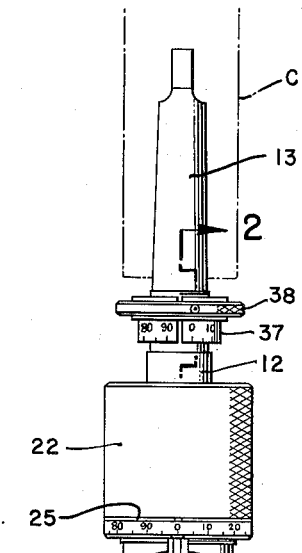
FIGURE 1 is a view in side elevation of one form of tool embodying the present invention.
Figure 4:
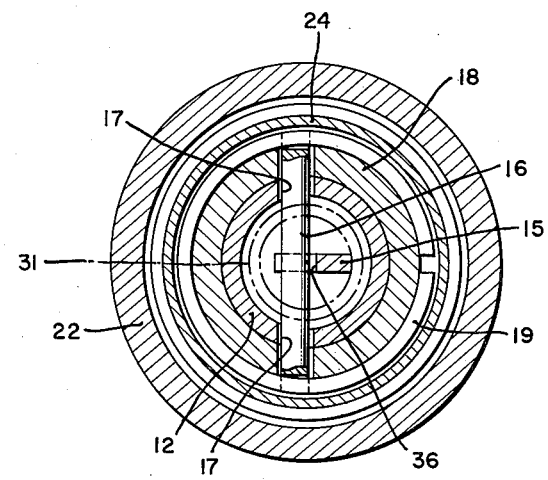
FIG. 4 is a horizontal section taken substantially upon the line 4—4 upon FIG. 2.
Figure 6:
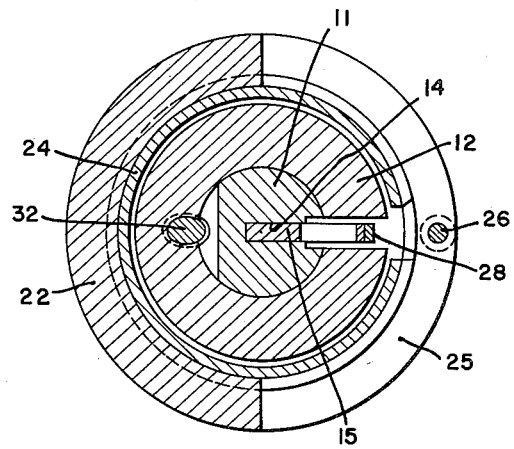
FIG. 6 is a horizontal section taken substantially upon the line 6—6 upon FIG. 2.
Figure 5:
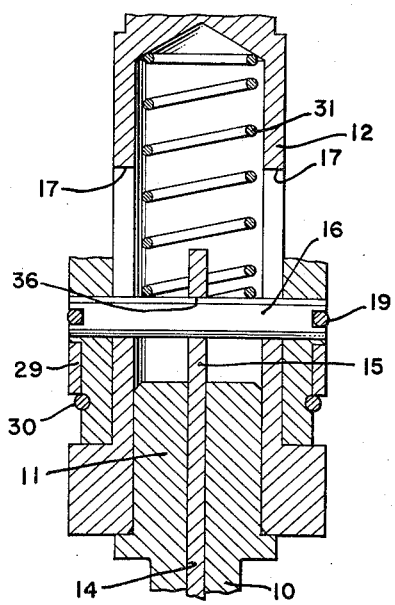
FIG. 5 is a partial view in vertical section taken substantially upon the line 5—5 upon FIG. 2.

Referring to the accompanying drawings wherein similar reference characters designate similar parts throughout, the tool illustrated in FIGS. 1 to 7, inclusive, consists of a generally cylindrical pilot 10 having an enlarged head 11 on its upper end which is telescopically receivable in a hollow spindle 12. The spindle 12 may have integral therewith in its upper end a tapered shank 13 or the equivalent which is adapted to be inserted in the chuck C of a drill press or equivalent operating mechanism.

Figure 2:
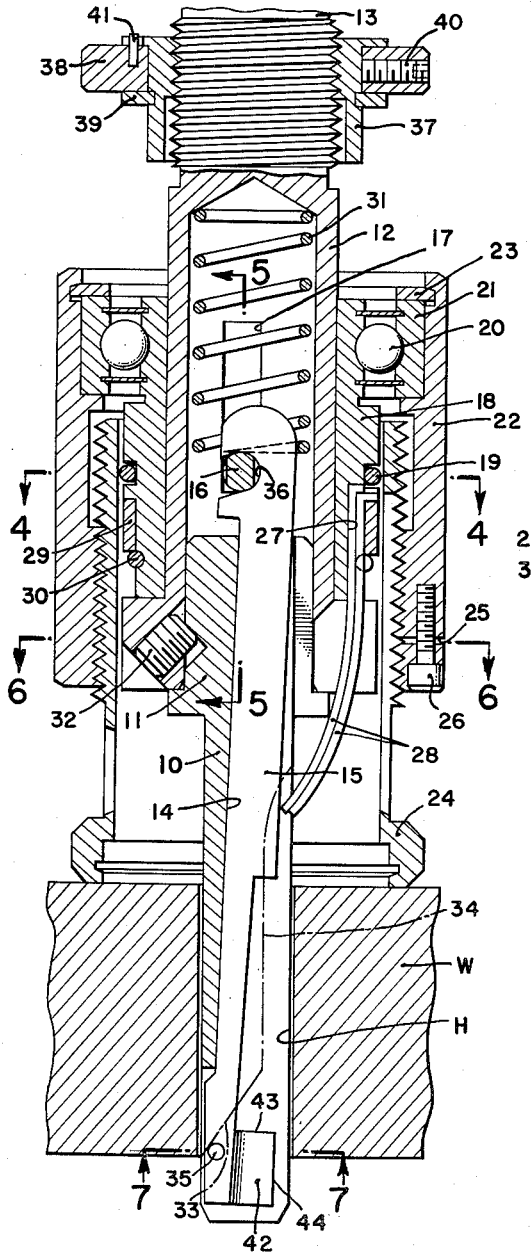
FIG. 2 is a vertical section on an enlarged scale taken substantially upon the line 2—2 upon FIG. 1 and illustrating the tool as having been applied to a workpiece that is to be worked upon by the tool, the cutter being shown in its retracted position.
Figure 3:
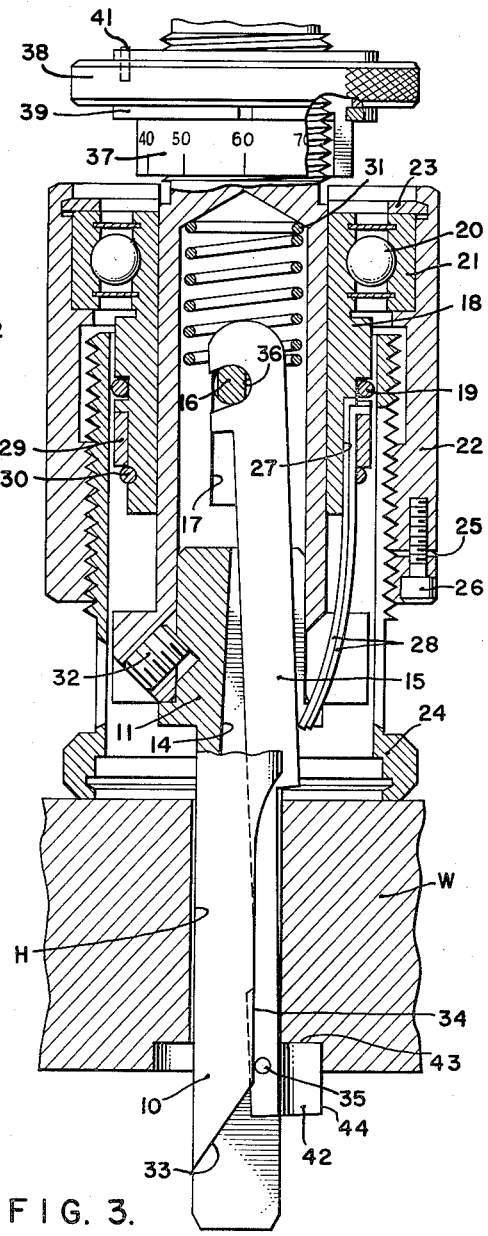
FIG. 3 is a view similar to FIG. 2, but illustrating the cutter in its fully advanced position.

The pilot 10 is adapted to be inserted in a hole H formed in a workpiece W and rotated therein by means of the shank 13 to perform the various operations of deburring, chamfering, back spot-facing or internal grooving as will hereinafter be described. The pilot has a longitudinally extending groove 14 formed therein which is adapted to receive and normally contains a blade-like cutter 15. The cutter 15 is swingably suspended from a pivot pin 16 that extends through slots 17 formed on opposite sides of the hollow spindle 12 so that the cutter may either assume a retracted position wholly within the pilot 10 as illustrated in FIG. 2, or an advanced or projecting position projecting from the pilot as illustrated in FIG. 3.

The ends of the pivot pin 16 extend through a bushing 18 which fits about the hollow spindle 12 and is slidable relatively thereto within the limits permitted by the ends of the slots 17. The ends of the pivot pin 16 are recessed to accommodate a split snap ring 19, see FIGS. 4 and 5, which serves to confine the pivot pin within the bushing 18. The bushing 18 provides the inner race for an anti-friction bearing 20, the outer race 21 of which is mounted in a sleeve 22 and held therein by means of a snap ring 23. A skirt 24 is threadedly mounted within the lower end of the sleeve 22 so as to be axially adjustable relatively to the sleeve. The lower portion of the sleeve is split or divided on one side as indicated at 25, and a set screw 26 extends through this lower portion and into the sleeve which on being tightened, will cause the lower portion to bind on the threads of the skirt and thus lock the skirt 24 in any adjusted position with relation to the sleeve 22. As the bushing 18 is held against axial movement with relation to the sleeve 22 by the anti-friction bearing 20 and the ends of the pivot pin 16 are mounted in the bushing 18, it will be appreciated that axial adjustment of the skirt 24 locates the vertical distance of the pivot pin 16 above the top surface of the work W. Location of the pivot pin 16 by the adjustment of the skirt consequently locates or positions the cutting edge of the cutter 15 with relation to the work W when the skirt 24 is in engagement with the work.

One side of the bushing 18 is recessed at 27 to accommodate one or more leaf springs 28 which bear at their lower ends on the forward edge of the cutter 15 and constantly urge the cutter into its retracted position within the pilot 10. These leaf springs are retained in their recess by a surrounding band 29 which surrounds the bushing 18 and which is retained in position by means of a split snap ring 30.

A coil compression spring 31 is disposed within the hollow spindle 12 and bears at its top against the closed top of the spindle. This compression spring bears at its lower end on the pivot pin 16 and serves to constantly but yieldably urge the spindle and the pilot into their uppermost positions relatively to the skirt 24 and to the cutter 15.

The pilot 10 is detachably mounted in the spindle 12 preferably by means of a single inclined socketed set screw 32 which is accessible through one or more openings formed in the side of the skirt 24. The pilot 10 on one side of the groove 14 adjacent its lower end presents a beveled or inclined surface 33 which terminates at its upper end at its juncture with a vertical surface 34. The cutter 15 is equipped with a pin 35 which normally engages the inclined surface 33. However, when the pilot and spindle are moved axially downward from the position shown in FIG. 2, this pin may pass from the inclined surface 33 onto the vertical surface 34 as illustrated in FIG. 3. In the latter position the cutter has been projected from the pilot to its maximum extent.

The upper end of the cutter is mounted on the pivot pin for swinging movement relatively thereto by means of a laterally open hook, the crotch 36 of which is slightly downwardly inclined. It will be noted that the pivot pin 16 need not be on a diameter through the tool but may be slightly spaced from a diameter as illustrated in FIGS. 2 and 3. By reason of the laterally open hook or crotch 36 it will be appreciated that when the set screw 32 is removed and the pilot 10 is withdrawn from the spindle by sliding it downwardly relatively to the cutter 15, the cutter 15 can then be axially turned or twisted about its longitudinal axis. In so turning the cutter the plane of the cutter blade will assume a position parallel to the axis of the pivot pin 16 against the side of the pivot pin and can consequently be withdrawn from the spindle 12. The cutter blade may then be substituted or replaced with another cutter blade and the same or a substitute pilot can then be applied to the cutter blade inserted in the spindle 12 and locked in position by the set screw 32.

The upper portion of the spindle 12 is externally threaded beneath the shank 13 and a split flanged bushing 37 is mounted thereon. This bushing has a downwardly extending skirt on which graduations may be stamped. A knurled ring 38 encircles the bushing and is confined between a top flange thereon and a snap ring 39. This knurled ring has a set screw 40 that can be tightened to firmly press the split bushing 37 adjacent an end thereof against the threaded portion of the spindle 12 to lock the bushing in any adjusted position. The knurled ring 38 is pinned such as by a pin 41 against rotation relative to the bushing. The skirt of the bushing is engageable with the top of bushing 18 and when used it serves as an adjustable stop limiting downward movement of the spindle and its associated pilot relative to the cutter. This may be advantageously employed whenever it is desired to limit the extent to which the cutter is projected from the side of the pilot.

Figure 7:
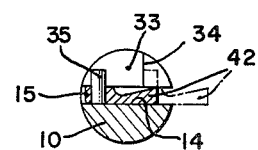
FIG. 7 is a horizontal section taken substantially upon the line 7—7 upon FIG. 2.

The form of cutter illustrated in FIGS. 2, 3, and 7 is of a type that can be advantageously employed in back spot-facing and similar operations in which case, the blade 42 may have its top edge 43 and its side edge 44 sharpened. It will be appreciated that when the back spot-face must be machined on a plane perfectly perpendicular to the axis of the hole H that the top edge 43 can be so formed or ground as to be perfectly perpendicular to the axis of the pilot when the pin 35 is in engagement with the vertical surface 34 on the pilot.

The particular form of the cutter blade may vary considerably, for example it may have the approximate size and shape as illustrated in FIGS. 2 and 3 for back spot-facing and performing similar operations. On the other hand, if it is desired to merely debur the edges of the hole H or to chamfer, it may assume the shape illustrated in FIGS. 8 and 9. On the other hand, if it is desired to groove the walls of the hole the blade may assume the shape illustrated in FIGS. 10 and 11. For some operations a mere burnishing is desirable, in which case either or both of the cutting edges, instead of being ground to perform a cutting operation, are ground on a radius to present a rounded surface designedt o burnish or cause a cold flow of metal that is being worked upon.

The operation of the above described construction is as follows:

The skirt 24 is so adjusted relative to the outer sleeve 22 as to properly locate the cutting edges of the blade 42 to perform the desired cutting operation. This may be somewhat facilitated by having an index point on the skirt 24 arranged to traverse graduations stamped in the lower portion of the sleeve 22 as illustrated in FIG. 1. When the adjustment of the skirt 24 relative to the sleeve 22 has been made this accurately locates the pivot pin 16 and consequently the edges of the blade 42 with relation to the work. When the skirt 24 is positioned against the upper face of the work and the pilot has been inserted into the hole H, the shank 13 is rotated rotating the spindle 12 and consequently the pilot. Rotation of the spindle and pilot of course also involves a rotation of the cutter 15 and of the bushing 18. On forcing the shank 13 downwardly the pilot 10 is forced downwardly and the inclined surface 33 cams against the pin 35 forcing the lower end of the cutter to swing outwardly into engagement with the work to perform the cut. When the pin 35 reaches the upper end of the inclined surface 33 and passes onto the vertical surface 34 further expansion or outward movement of the cutter is discontinued and any further downward movement of the spindle and pilot may thereafter be regarded as mere overtravel, not involving any further outward movement of the cutter. This arrangement is advantageous where a plurality of these tools are used in a multiple drill press to perform multiple operations simultaneously on the workpiece W in that each tool is not required to have its shank 13 spaced from the top surface of the workpiece W the same distance as the shank of other tools. If the shank 13 is spaced to a greater or lesser extent from the work W it merely involves a higher or lower stroke of the pilot 10. If the pilot 10 is not forced downwardly to a great extent, the pin 35 may pass onto the vertical surface 34 only a short distance. One the other hand, if the stroke of the pilot 10 is lowered by reason of the shank 13 being positioned closer to the top surface of the workpiece W, this merely means that the pin 35 will pass upwardly onto the vertical surface 34 to a greater extent or with greater over-travel. As previously explained, however, over-travel of the pin 35 onto the surface 34 does not involve a further expansion of the cutter.

Figure 8:
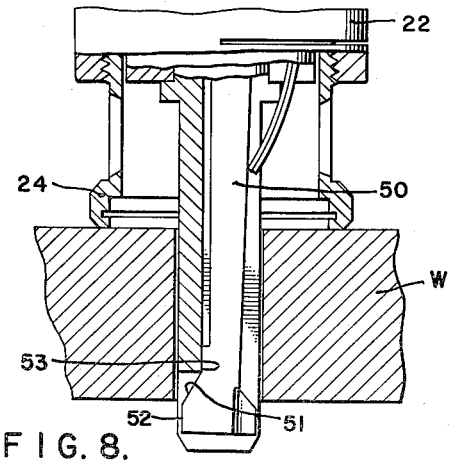
FIG. 8 is a partial view in vertical section illustrating an alternative form of construction embodying the present invention, the cutter shown being of the type that is suitable for deburring or chamfering and illustrated in its retracted position.
Figure 9:
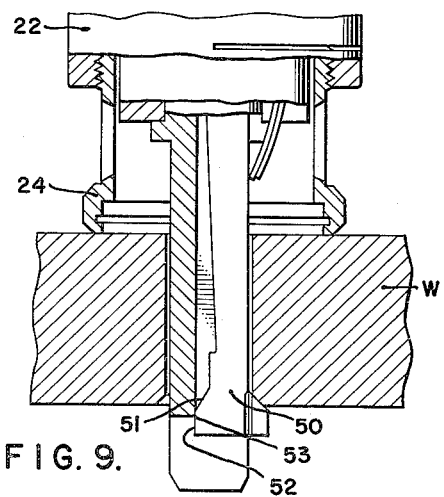
FIG. 9 is a view similar to FIG. 8, but illustrating the cutter in its fully advanced position.

In the construction shown in FIGS. 8 and 9, the change made from that construction previously described resides primarily in the location of the inclined surface that produces the expansion of the cutter. Thus, the cutter 50 in this form of construction has an inclined surface 51 formed on its back and this inclined surface terminates at its lower end at a juncture with a vertical surface 52 which is also formed on the back of the cutter. The inclined surface 51 engages with an edge 53 on the pilot. When the pilot is forced downwardly relatively to the cutter the edge 53 on the pilot engages the inclined edge 51 causing the cutter to swing laterally with respect to the pilot and to be projected therefrom. Ultimately, as illustrated in FIG. 9, the edge 53 may pass onto the vertical surface 52 and from thereon downwardly the pilot produces no further expansion of the cutter and may be regarded as having merely over-traveled. The inclined surface 51 and vertical surface 52 on the cutter consequently perform the same functions as the inclined surface 33 and the vertical surface 34 which were on the pilot in that form shown in FIGS. 2 and 3.

Figure 10:
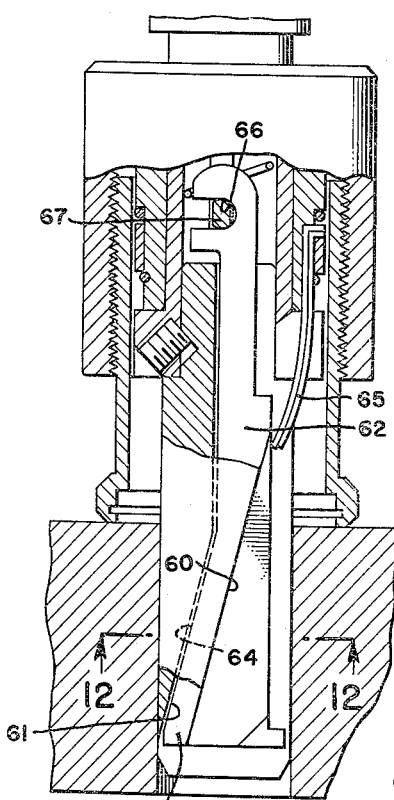
FIG. 10 is a partial view in vertical section but illustrating another form of construction, the cutter shown being illustrated in its fully retracted position and of the type that is suitable for use in internal grooving.
Figure 12:
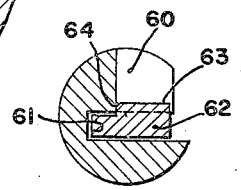
FIG. 12 is a horizontal section taken substantially upon the line 12—12 upon FIG. 10 in the direction indicated.
Figure 11:
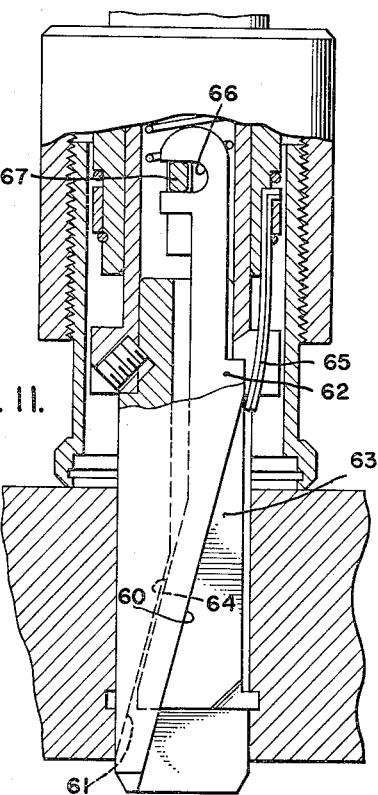
FIG. 11 is a view similar to FIG. 10, but illustrating the cutter in its partially advanced position.

In the form of construction illustrated in FIGS. 10 to 12, inclusive, the pilot has an inclined surface 60 at the side of the vertical groove 61 that accommodates and receives the cutter 62. That side of the cutter 62 which faces the cutaway portion of the pilot that provides the inclined surface 60 has a triangular projection 63 that forms or provides an inclined surface 64 complementary to the inclined surface 60 on the pilot. These opposed inclined surfaces are of considerable length and remain in engagement as the pilot descends, compare FIG. 10 with FIG. 11.

The upper end of the inclined surface 64 on the cutter is disposed below the point of engagement with the leaf springs 65 which continually urge the cutter into engagement with the inclined surface 60 on the pilot without involving any turning moment tending to rock the cutter with relation to the inclined surface 60. In this form of construction the crotch 66 of the laterally open hook on the cutter is preferably horizontal or at right angles to the axis of the pilot and the cutter, instead of swinging on the pivot pin 67, slides laterally relatively thereto maintaining the same vertical position as it is projected outwardly or cammed outwardly by the mutually engaged inclined surfaces 60 and 64. As the two surfaces 60 and 64 are of considerable length they are capable of maintaining the cutter in this position during the expansion or advancement of the cutter to perform an internal grooving operation in the work such as that illustrated.

In the construction illustrated in FIGS. 13 to 16, inclusive, the pilot 70 is detachably mounted in the lower end of a hollow spindle 71 by means of a set screw 72 as before. A bushing 73 surrounds the spindle and is pinned or feathered, such as by a pin 74 to rotate therewith but at the same time allow the spindle 71 and pilot to descend relatively thereto. A second bushing 75 is interposed between the bushing 73 and an outer externally threaded sleeve 76. This sleeve has a thrust bearing 77 interposed between it and the bushing 73 retained in position by means of a snap ring 78.

The outer sleeve 76 is threaded into the skirt 79 which is engageable with the top face of the workpiece W. The top of the skirt is split as at 80 and a set screw 81 and ball 82 may be used to spread the split 80 to clamp the skirt on the sleeve 76 in any adjusted position. The pivot pin 83 extends across a slot 84 in the lower portion of the bushing 73 at a location decidedly remote from a diameter. In this form of construction the cutter 85 normally occupies a longitudinally extending recess in the pilot 70 and has at its top a laterally extending arm 86 that engages the pivot pin 83 so as to be swingably mounted thereon by means of a laterally open hook. In this form of construction, however, the crotch 87 of the hook is opened downwardly. The spindle 71 contains a coil compression spring 88 seated at its top on the closed top of the spindle and at its bottom on a ball 89 that engages the top of the cutter 85. The pressure exerted by the ball on the cutter serves to urge the cutter into its retracted position within the pilot and the upward pressure exerted by the spring 88 on the spindle causes the spindle and the pilot to be urged into their uppermost positions relative to the outer sleeve 76 and the skirt 79.

In this form of construction the cutter blade may have an inclined camming surface 90 corresponding to and functioning similar to the inclined surface 51. On the other hand, the cutter blade may be constructed in a manner similar to the cutter blade 15 in FIGS. 2 and 3, and the inclined surface may be formed on the pilot. The shape of the cutter blade 91 may conform to whatever type of work that is to be performed thereby. The upper portion of the spindle 71 is externally threaded and may be equipped with any suitable form of adjustable limiting collar 92 that will limit downward movement of the spindle and of the pilot relative to the outer sleeve 76 by engagement with the top of the bushing 73.

The operation of this form of construction is substantially the same as that previously described. It will be noted, however, that on mere removal of a single set screw 72 the pilot 70 can be detached and thereafter, on removal of the skirt 79 the cutter 85 can be tipped out of the spindle 71 and disengaged from the pivot pin 83 without disturbing the pivot pin.

In all forms of construction it will be observed that the force urging expansion or outward movement of the cutter blade relatively to the pilot is applied to the cutter at a point in the immediate vicinity of the cutter blade. Thus, in the construction shown in FIGS. 2 and 3, the camming surface 33 applies its expanding force to the cutter on the pin 35 which is horizontally behind the cutter blade 42. Similarly, in the construction shown in FIGS. 8 and 9 the force applied by the edge 53 to the inclined surface 51 is applied to the cutter at a point in the immediate vicinity and virtually horizontally behind the cutter blade. Similarly, the mutually engaged surfaces 60 and 61 in FIGS. 10 and 11 cause the force urging the cutter to expand are applied to the cutter very close to the cutter blade. The same is true of the mutually engaging surfaces 90 and 93 in the construction shown in FIGS. 13 and 14. By applying the expanding force to the cutter at a location very close to or immediately behind the cutter blade the cutter, which is necessarily formed of thin metal, is not caused to function as a long lever. The strength of the pilot which can be made of considerably heavier stock than the cutter, can thus be advantageously used to steady and back up the cutter blade and oppose the reactionary forces applied thereto by the workpiece W in the course of cutting. Consequently, chattering of the tool can be eliminated and the cutter can be caused to perform its operations with a much higher degree of precision.

Various changes may be made in the details of construction without departing from the spirit and scope of the invention as defined by the appended claims.

I claim:

1. A device of the class described comprising a pilot adapted to be inserted into a hole in a piece of work and rotated therein, a cutter normally occupying a recess in the pilot and rotatable therewith, means engageable with the work for holding the cutter against longitudinal movement relatively thereto, means for moving the pilot longitudinally relatively to the cutter, and mutually engaging means between the cutter and pilot located closely adjacent the cutting edge of the cutter for moving the cutter laterally relatively to the pilot so as to project the cutting edge therefrom into engagement with the work.

2. A device of the class described comprising a pilot adapted to be inserted in a hole in a piece of work and rotated therein, a cutter normally occupying a recess in the pilot and rotatable therewith, means engageable with the work for holding the cutter against longitudinal movement relatively thereto, means for moving the pilot longitudinally relatively to the cutter, and mutually engaging means between the cutter and pilot located closely adjacent that portion of the cutter which is engageable with the work for moving the cutter laterally relatively to the pilot so as to project said portion of the cutter therefrom into engagement with the work.

3. A device of the class described comprising a pilot adapted to be inserted into a hole in a piece of work and rotated therein, a cutter normally occupying a recess in the pilot and rotatable therewith, means engageable with the face of the work on which the cutter is swingably mounted, means urging the cutter into retracted position in the pilot, means for moving the pilot axially relative to the cutter, and mutually engaging means between the cutter and the pilot located adjacent the cutting edge of the cutter for moving the cutting edge of the cutter laterally with respect to the pilot.

4. A device of the class described comprising a pilot adapted to be inserted in a hole in a piece of work and rotated therein, a hollow spindle, means detachably connecting the pilot to the spindle, work-face engageable means engageable with the face of the work on which the spindle and pilot are rotatably mounted and relatively to which the spindle and pilot are axially movable, a cutter normally disposed in a recess in the pilot swingably mounted on the work-face engageable means, means for swinging the cutter laterally relative to the pilot when the pilot and spindle are moved axially, said cutter being mounted on the work-face engageable means by an open-sided hook, whereby on detachment of the pilot from the spindle the cutter can be detached from the work-face engageable means and replaced.

5. A device of the class described comprising a pilot adapted to be inserted in a hole in a piece of work and rotated therein, a hollow spindle, means detachably connecting the pilot to the spindle, work-face engageable means engageable with the face of the work on which the spindle and pilot are rotatably mounted and relatively to which the spindle and pilot are axially movable, a cutter normally disposed in a recess in the pilot swingably mounted on the work-face engageable means, means for swinging the cutter laterally relative to the pilot when the pilot and spindle are moved axially, said cutter being mounted on the work-face engageable means by an open-sided hook formed in the cutter, whereby on detachment of the pilot from the spindle the cutter can be detached from the work-face engageable means and replaced.

6. A device of the class described comprising a pilot adapted to be inserted in a hole in a piece of work and rotated therein, a hollow spindle, means detachably connecting the pilot to the spindle, work-face engageable means engageable with the face of the work on which the spindle and pilot are rotatably mounted and relatively to which the spindle and pilot are axially movable, a cutter normally disposed in a recess in the pilot swingably mounted on the work-face engageable means, means for swinging the cutter laterally relative to the pilot when the pilot and spindle are moved axially, said cutter being mounted on the work-face engageable means by an open-sided hook, whereby on detachment of the pilot from the spindle the cutter can be detached from the work-face engageable means and replaced, and spring means urging the pilot and spindle into their uppermost positions relative to the cutter.

7. A device of the class described comprising a pilot adapted to be inserted in a hole in a piece of work and rotated therein, a hollow spindle, means detachably connecting the pilot to the spindle, work-face engageable means engageable with the face of the work on which the spindle and pilot are rotatably mounted and relatively to which the spindle and pilot are axially movable, a cutter normally disposed in a recess in the pilot swingably mounted on the work-face engageable means, means for swinging the cutter laterally relative to the pilot when the pilot and spindle are moved axially, said cutter being mounted on the work-face engageable means by an open-sided hook, whereby on detachment of the pilot from the spindle the cutter can be detached from the work-face engageable means and replaced, spring means urging the cutter into retracted position in the pilot, and spring means urging the pilot and spindle into their uppermost positions relatively to the cutter.

8. A device of the class described comprising a pilot adapted to be inserted in a hole in a piece of work and rotated therein, a hollow spindle, means detachably connecting the pilot to the spindle, work-face engageable means engageable with the face of the work on which the spindle and pilot are rotatably mounted and relatively to which the spindle and pilot are axially movable, a cutter normally disposed in a recess in the pilot swingably mounted on the work-face engageable means, means for swinging the cutter laterally relative to the pilot when the pilot and spindle are moxed axially, said cutter being mounted on the work-face engageable means by an open-sided hook, whereby on detachment of the pilot from the spindle the cutter can be detached from the work-face engageable means and replaced, and spring means in the spindle effective on the spindle to urge the spindle upwardly relatively to the cutter and also effective on the cutter to urge the cutter to swing into retracted position relatively to the pilot.

9. A device of the class described comprising a pilot adapted to be inserted in a hole in a piece of work and rotated therein, a hollow spindle, means detachably connecting the pilot to the spindle, work-face engagable means engageable with the face of the work on which the spindle and pilot are rotatably mounted, said work-face engageable means being axially adjustable in length, said spindle and pilot being axially movable relatively to the work-face engageable means, a cutter normally disposed in a recess in the pilot supported by the work-face engageable means, means for moving the cutter laterally relative to the pilot when the pilot and spindle are moved axially, and means for limiting movement of the spindle and pilot in an axial direction relative to the work-face engageable means.

10. A device of the class described comprising a pilot adapted to be inserted in a hole in a piece of work and rotated therein, a hollow spindle, means detachably connecting the pilot to the spindle, work-face engageable means engageable with the face of the work on which the spindle and pilot are rotatably mounted and relatively to which the spindle and pilot are axially movable, a cutter normally disposed in a recess in the pilot and supported on the work-face engageable means, means for moving the cutter laterally relatively to the pilot when the pilot and spindle are moved axially, said cutter being detachable from the work-face engageable means and removable from the spindle on detachment of the pilot from the spindle.

11. A device of the class described comprising workface-engageable means, a pilot adapted to be inserted into a hole in the workface mounted on the workface-engageable means for rotation and axial movement relatively thereto, a cutter within the pilot rotatable therewith, means mounting the cutter on the workface-engageable means for lateral movement relatively to the pilot but not axial movement relative to the workface-engageable means, means for moving the pilot axially of the workface-engageable means, and mutually engageable surfaces between the cutter and pilot at least one of which is inclined to the axis of rotation of the pilot and which are located closely adjacent the cutting edge of the cutter for advancing the cutter laterally relative to the pilot when the pilot is moved axially relatively to the workface-engageable means and the cutter.

12. A device of the class described comprising workface-engageable means, a spindle and pilot mounted on the workface-engageable means for rotation and axial movement relatively thereto, means detachably connecting the pilot to the spindle, a cutter in the pilot detachably mounted on the workface-engageable means for detachment from the workface-engageable means when the pilot is detached from the spindle, said cutter being held against longitudinal movement relative to the workface-engageable means but not against lateral movement relatively thereto, and means for moving the cutter laterally relative to the pilot when the pilot is moved axially relative to the cutter.

13. A device of the class described comprising workface-engageable means, a spindle and pilot mounted on the workface-engageable means for rotation and axial movement relatively thereto, a means detachably connecting the pilot to the spindle, a pin and open-sided hook connection between the cutter and the workface-engageable means holding the cutter against longitudinal movement relative to the workface-engageable means but not against lateral movement relatively thereto and enabling the cutter to be detached from the workface-engageable means when the pilot is detached from the spindle, and means for moving the cutter laterally relatively to the pilot when the pilot and spindle are moved axially relative to the workface-engageable means.

14. A device of the class described comprising workface-engageable means, a spindle and pilot mounted on the workface-engageable means for rotation and axial movement relatively thereto, means detachably connecting the pilot to the spindle, a pin and open-sided hook connection between the cutter and the workface-engageable means holding the cutter against longitudinal movement relative to the workface-engageable means but not against lateral movement relatively thereto and enabling the cutter to be detached from the workface-engageable means when the pilot is detached from the spindle, there being mutually engaging surfaces between the cutter and pilot at least one of which is inclined to the axis of rotation of the pilot for moving the cutter laterally relative to the pilot when the pilot is moved axially relative to the cutter, said surfaces being located closely adjacent the cutting edge of the cutter.

15. A device of the class described comprising workface-engageable means, a spindle and pilot mounted on the workface-engageable means for rotation and axial movement relatively thereto, means detachably connecting the pilot to the spindle, a pin and open-sided hook connection between the cutter and the workface-engageable means holding the cutter against longitudinal movement relative to the workface-engageable means but not against lateral movement relatively thereto and enabling the cutter to be detached from the workface-engageable means when the pilot is detached from the spindle, there being an inclined surface on the cutter which is inclined to the axis of rotation of the pilot engageable by the pilot when the pilot is moved longitudinally relative to the cutter for advancing the cutter laterally toward the work.

16. A device of the class described comprising workface-engageable means, a spindle and pilot mounted on the workface-engageable means for rotation and axial movement relatively thereto, means detachably connecting the pilot to the spindle, a pin and open-sided hook connection between the cutter and the workface-engageable means holding the cutter against longitudinal movement relative to the workface-engageable means but not against lateral movement relatively thereto and enabling the cutter to be detached from the workface-engageable means when the pilot is detached from the spindle, there being mutually engaging surfaces between the cutter and pilot at least one of which is inclined to the axis of rotation of the pilot for moving the cutter laterally relative to the pilot when the pilot is moved axially relative to the cutter, said surfaces being located closely adjacent the cutting edge of the cutter, spring means urging the spindle and pilot into retracted position relative to the workface-engageable means, and spring means urging the cutter into retracted position relative to the pilot.

17. A device of the class described comprising workface-engageable means, a spindle and pilot mounted on the workface-engageable means for rotation and axial movement relatively thereto, means detachably connecting the pilot to the spindle, a pin and open-sided hook connection between the cutter and the workface-engageable means holding the cutter against longitudinal movement relative to the workface-engageable means but not against lateral movement relatively thereto and enabling the cutter to be detached from the workface-engageable means when the pilot is detached from the spindle, there being an inclined surface on the cutter which is inclined to the axis of rotation of the pilot engageable by the pilot when the pilot is moved longitudinally relative to the cutter for advancing the cutter laterally toward the work, spring means urging the spindle and pilot into retracted position relative to the workface-engageable means, and spring means urging the cutter into retracted position relative to the pilot.

References Cited in the file of this patent

"Machinery" magazine, vol. 79, page 1121, December 27, 1951, London, Great Britain.